United States Patent
Epple

[11] 3,909,934
[45] Oct. 7, 1975

[54] METHOD OF PRODUCING A MEASURING HEAD FOR MEASURING ELECTRICAL COMPONENTS

[75] Inventor: Richard Epple, Schwaigern, Germany

[73] Assignee: Licentia Patent-Verwaltungs-G.m.b.H., Frankfurt am main, Germany

[22] Filed: Dec. 3, 1973

[21] Appl. No.: 421,164

[30] Foreign Application Priority Data
Dec. 2, 1972 Germany............................ 2259132

[52] U.S. Cl................................... 29/628; 29/625
[51] Int. Cl.²....................................... H01R 43/00
[58] Field of Search .................. 317/101 A, 101 B; 324/158 F, 158 P; 29/624, 625, 626, 627, 628, 629, 630 R, 630 A, 630 B; 339/17 CF; 174/68.5

[56] References Cited
UNITED STATES PATENTS
| | | | |
|---|---|---|---|
| 3,508,151 | 4/1970 | Forcier | 324/158 |
| 3,560,907 | 2/1971 | Heller | 339/17 CF |
| 3,780,432 | 12/1973 | Baas et al. | 29/625 |

OTHER PUBLICATIONS
IBM Technical Disclosure Bulletin, Vol. 9, No. 10, March 1967, p. 1305.

*Primary Examiner*—C. W. Lanham
*Assistant Examiner*—James R. Duzan
*Attorney, Agent, or Firm*—Spencer & Kaye

[57] ABSTRACT

A method of producing a measuring head for measuring electrical components comprises attaching to a carrier body a contact sheet in which at least the attached part of the sheet is coherent and completely separating the contact sheet into contact strips after attachment to the carrier body.

6 Claims, 3 Drawing Figures

METHOD OF PRODUCING A MEASURING HEAD FOR MEASURING ELECTRICAL COMPONENTS

BACKGROUND OF THE INVENTION

The invention relates to a method of producing a measuring head for measuring electrical components, such as semiconductor switching circuits, which comprise a carrier body and contact strips located on the carrier body.

Today, so-called multi-contact measuring arrangements are used for measuring the electrical parameters and the functions of monolithic switching circuits. In order to be able to carry out not only static but also dynamic measurements, the multi-contact arrangement must be of low inductance and of low capacitance. The hitherto usual devices, which are called multi-probers, comprise individual fine contact needles, which are adjustable in the $x$ and $y$ direction as well as with respect to height adjustment. These multi-probers are completely sufficient and appropriate for measuring distances which are not too small and for static electrical measurements. If the measuring distances, on the other hand, become smaller, or if dynamic measurements are to be carried out, then so-called measuring spiders with substantially smaller self-capacitance and self-inductance values must be used. As a rule such measuring spiders have areal metal contacts, which are stamped out or etched out of a suitable metal strip or of a metal foil. A suitable insulating material such a ceramic is used as the carrier body. Frequently the areal metal contacts are tapered towards the contact-making end. In order to achieve a certain elasticity of the contact points, the contact fingers are bent in a suitable manner or the carrier bodies have a recess under the contact points.

The distance between the points to be contacted and the size of the areas to be contacted depend on the technical state of the contacting technology. As a rule the ultrasonic bonding technique demands a minimal size of the surfaces to be contacted of approximately 100 microns, if short circuits are to be avoided, whereas the thermocompression bonding technique permits contacting of 50 micron surfaces with a distance of likewise 50 microns. However, on the other side, the known production processes for measuring heads still do not permit the production of measuring heads, which meet with the requirement for distances between spots to be contacted which are becoming smaller and smaller. This requirement is substantially to be attributed to the complexity of switching circuits, which is becoming greater and greater, and to the endeavor of making the semiconductor wafers smaller and smaller for reasons of efficiency.

SUMMARY OF THE INVENTION

It is an object of the invention to provide a method which permits the production of measuring heads which are able to pick up smaller contact spots than hitherto, with smaller mutual distances.

According to a first aspect of the invention, there is provided a method of producing a measuring head for measuring electrical components, particularly semiconductor switching circuits, which comprises a carrier body and contact strips located on the carrier body, characterized in that a contact sheet is secured to the carrier body and that this contact sheet is divided into contact strips only after fastening of the contact sheet onto the carrier body.

According to a second aspect of the invention, there is provided a method of producing a measuring head for electrical components comprising attaching to a carrier body a contact sheet which is coherent in at least the region of said contact sheet which is attached to said carrier body and thereafter dividing at least said coherent region into contact strips.

BRIEF DESCRIPTION OF THE DRAWINGS

The invention will now be described in greater detail, by way of example, with reference to the drawings, in which.

DESCRIPTION OF THE PREFERRED EMBODIMENTS

In the case of a method of the type mentioned at the outset, the invention basically proposes that a contact sheet be secured to the carrier body and that this contact sheet be divided into contact strips only after it has been secured to the carrier body.

The division of the contact sheet into contact strips is preferably effected by a laser or electron radiation treatment. The contact sheet generally comprises metal. Any contact material whatever in sheet form is to be understood by the term contact sheet.

Also an already preslit contact strip can be used instead of a coherent contact sheet, which contact sheet however is completely divided into contact strips separated from each other only after it has been secured to the carrier body. Such a contact sheet is preslit in such a manner that the structures of the contact strips are in fact partially already present; a complete separation of the contact strips or into contact strips is effected in this case only after securing the contact sheet on the carrier body. Thus the contact strips are, when using a preslit contact sheet, likewise still partially connected together before contacting in accordance with the invention, that is to say, in general in that region of the contact sheet which is firmly connected to the carrier body. The contact strip is generally not rigidly connected by its entire surface to the carrier body, but only with a part, since in general contact strips are sought which project beyond the edge of the carrier body and project into a recess of the carrier body in the center region of the carrier body. The bonding of the contact sheet to the carrier body is effected for example by soldering or welding.

As already stated, the separation of the contact sheet into contact strips takes place after the bonding of the contact sheet to the carrier body preferably by a laser or electron beam treatment. As is well known an electron beam is that instrument which permits the smallest surface operations. Thus there exists today the possibility of undertaking mechanical operations under one-tenth micron with the help of an electron beam. In addition complicated operational processes can be automated by a precise control or magnetic deflection of the electron beam. Either a material evaporation or also only a welding to the spot picked out by the electron beam is achieved in dependence on the radiation energy used.

Laser beams have a greater wave length than electron beams and can therefore not treat small surfaces the same as electron beams can. The surfaces picked out by the laser beams, however, are still of the order of magnitude of 1 micron and are therefore small enough to make possible substantial progress with regard to other techniques. As opposed to the electron beam, a laser beam, however, does not require a vacuum, so that laser beams require a lower expenditure than electron beams.

Figure 1A:
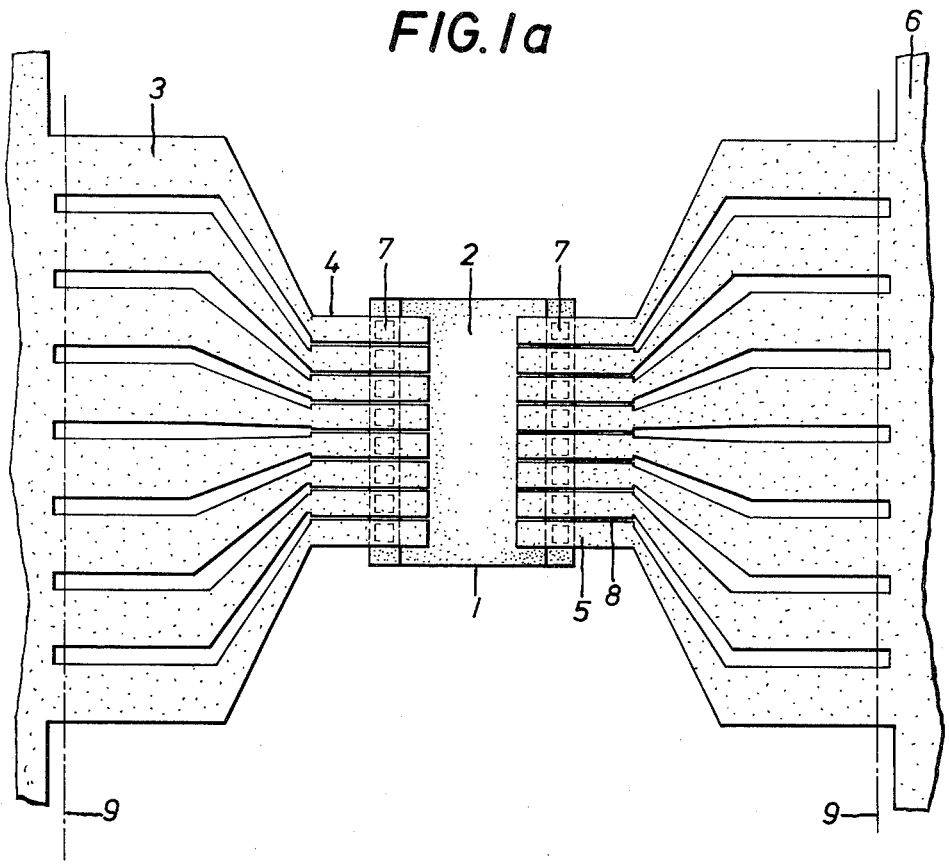
FIG. 1a is a plan view of the attachment of a contact sheet to two sides of a carrier body.
Figure 1B:
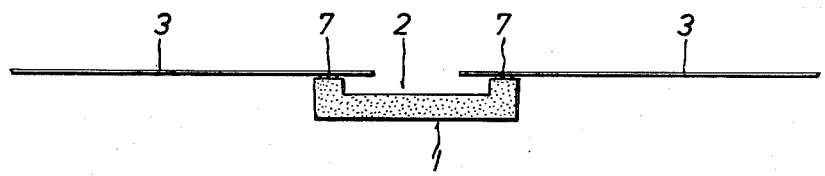
FIG. 1b is a side view of the construction of FIG. 1.

Referring now to the drawings, FIG. 1 shows the production of a measuring head according to the invention. The starting point for the production of a measuring head, in accordance with FIG. 1, is a carrier body 1, which has a recess 2 in the middle. The recess 2 can be a through opening or, in accordance with the sectional view of FIG. 1b, may be only a depression in the carrier body, which does not extend through it. The carrier body 1 comprises, for example, a ceramic plate.

Now, in accordance with FIG. 1a, contact strips 3 must be produced, which project into the recess 2 and are soldered or welded to the carrier plate 1. According to the invention, individual contact strips, separated from each other, are not initially produced. Rather contact sheets 4 are soldered or welded on to the carrier plate 1, which contact sheets are already subdivided partially into contact strips 3, but are not yet completely divided, so that the contact strips 3 are not yet completely separated from each other before the fastening of the contact sheets 4 to the carrier plate 1. The complete separation of the contact strips 3 is effected only after fastening of the contact sheets to the carrier body, since it is substantially easier to align a sheet, which is still coherent in its contact region, to a certain contact region than to align individual very narrow contact strips, which are already completely separated from each other before contacting. As can be seen from FIG. 1a the contact sheets 4 comprise a relatively small region 5 and a region 6 which is wider than the region 5 and makes possible a likewise widening of contact strips 3 as a result of this widening. The soldering or welding spots at which the contact sheets or, after the contacting the contact strips, are connected to the carrier plate, are given the reference numeral 7 in FIG. 1.

The separation of the contact strips 3 in the contact region, and thus in the region 5 of the contact sheet, is effected preferably by a laser or electron beam treatment. The separation is effected along the separating lines 8. The contact sheets 4 are therefore preslit, so that, after the contacting, too great a separating work and separating paths which are too long are not necessary. Since after contacting, which is synonymous with the fixed bonding of the contact sheets and carrier bodies, the contact sheets in general are also further connected at their other edges, a separation of the contact strips also takes place by cuts along the lines 9 shown broken.

Figure 2:
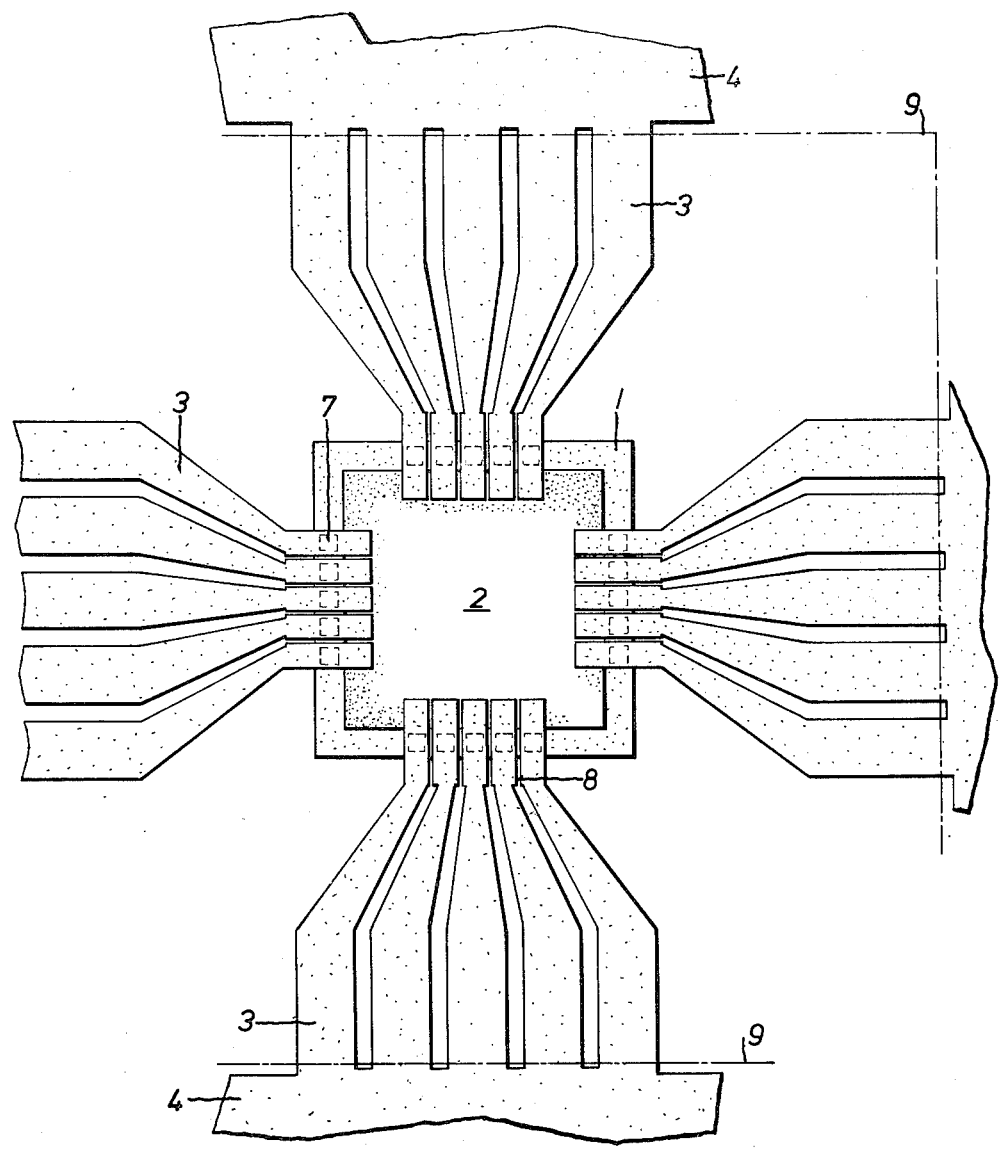
FIG. 2 is a plan view of the attachment of a contact sheet to four sides of a carrier body.

The measuring head of FIG. 2 differs from the measuring head of FIG. 1 merely in the fact, that contact strips 5 are applied not only on two sides but on all four sides of the carrier body 1.

It will be understood that the above description of the present invention is susceptible to various modifications, changes and adaptations.

What is claimed is:

1. A method of producing a measuring head for measuring electrical components which comprises a carrier body having a plurality of narrow contact strips attached to a surface thereof, said method comprising the steps of: providing a carrier body having a central recess extending to one surface thereof; placing a sheet of contact material, which is coherent in at least the portion thereof which is to overlie said one surface of said carrier body, on said one surface so that one end of said sheet extends over said recess; attaching said sheet to said one surface; and thereafter dividing said coherent portion into said plurality of narrow contact strips so that one end of each of said strips extends over said recess.

2. A method as defined in claim 1 wherein said step of placing includes positioning said contact sheet on said one surface so that the end of said sheet opposite said one end projects beyond the edge of said carrier body.

3. A method as defined in claim 2 wherein a contact sheet is used which is already preslit in the portion thereof which extends beyond the edge of the carrier body to provide a plurality of strips separated by spaces and wherein said step of dividing includes separating said coherent portion along lines of separation which intersect said spaces.

4. A method as defined in claim 1, wherein the dividing of said contact sheet into contact strips is effected after attaching to said carrier body by a laser treatment.

5. A method as defined in claim 1, wherein the dividing of said contact sheet into contact strips is effected after attaching to said carrier body by electron beam treatment.

6. A method as defined in claim 1, wherein said contact sheet is attached to said carrier body by soldering or welding.

* * * * *